(12) United States Patent
Norek

(10) Patent No.: US 6,966,271 B2
(45) Date of Patent: Nov. 22, 2005

(54) WAVELESS HULL

(76) Inventor: Richard S. Norek, 8 Garrison Dr., Eliot, ME (US) 03903

( * ) Notice: Subject to any disclaimer, the term of this patent is extended or adjusted under 35 U.S.C. 154(b) by 107 days.

(21) Appl. No.: 10/707,060

(22) Filed: Nov. 18, 2003

(65) Prior Publication Data

US 2005/0183649 A1     Aug. 25, 2005

Related U.S. Application Data

(63) Continuation-in-part of application No. 10/262,018, filed on Oct. 1, 2002, now Pat. No. 6,647,909.

(51) Int. Cl.$^7$ ............................... B63B 1/00
(52) U.S. Cl. .................. 114/56.1; 114/312; 114/41; 440/38
(58) Field of Search ............... 114/40, 41, 42, 114/56.1, 61.1, 61.31, 61.32, 140, 271, 274, 114/312; 440/38

(56) References Cited

U.S. PATENT DOCUMENTS

| | | | |
|---|---|---|---|
| 151,774 A * | 6/1874 | Grant ........................... 114/41 |
| 1,759,511 A * | 5/1930 | Kort ............................. 440/38 |
| 1,991,512 A * | 2/1935 | Miller ........................... 440/38 |
| 2,997,013 A | 8/1961 | Rice .............................. 115/11 |
| 3,521,591 A * | 7/1970 | Alexander .................... 114/41 |
| 4,767,370 A | 8/1988 | Campbell ..................... 441/74 |
| 5,088,433 A | 2/1992 | Osawa et al. .............. 114/67 R |
| 5,178,085 A | 1/1993 | Hsu ......................... 114/61.13 |
| 5,333,444 A | 8/1994 | Meng .......................... 60/221 |
| 5,402,743 A | 4/1995 | Holderman ................... 114/62 |
| 5,438,947 A | 8/1995 | Tam ............................ 114/312 |
| 5,497,722 A | 3/1996 | English ........................ 114/62 |
| 5,503,100 A | 4/1996 | Shaw ......................... 114/274 |
| 5,544,610 A | 8/1996 | Harding ...................... 114/312 |
| 5,592,895 A | 1/1997 | Schmidt ..................... 114/274 |
| 5,730,391 A | 3/1998 | Miller et al. .................. 244/36 |
| 5,954,009 A | 9/1999 | Esmiol ....................... 114/274 |
| RE36,879 E | 9/2000 | Schoell ....................... 114/291 |
| 6,112,687 A | 9/2000 | Eder ......................... 114/61.2 |
| 6,167,829 B1 | 1/2001 | Lang ........................... 114/278 |
| 6,250,245 B1 | 6/2001 | Robinson et al. ........... 114/288 |
| 6,250,246 B1 | 6/2001 | Hubley ....................... 114/288 |
| 6,314,903 B2 | 11/2001 | Robinson et al. ........... 114/288 |
| 6,345,584 B1 * | 2/2002 | Mascellaro ................. 114/290 |
| 6,526,903 B2 | 3/2003 | Robinson et al. ........... 114/288 |

* cited by examiner

*Primary Examiner*—Stephen Avila
(74) *Attorney, Agent, or Firm*—Phillip E. Decker; Mesmer & Deleault, PLLC

(57) ABSTRACT

A vessel hull that does not create bow, stern, or transverse waves when moving through the water having an exterior surface that has a substantially constant cross-section along the length of the hull, and an interior surface that substantially encloses a flow channel for the length of the hull, the interior surface forming a converging-diverging diffuser. One standing half wave is contained within the hull, and no waves are generated outside the hull. The hull operates most efficiently at higher speeds, and has broad applications, including icebreaker, hybrid displacement and waveless hull, and other hull types.

13 Claims, 10 Drawing Sheets

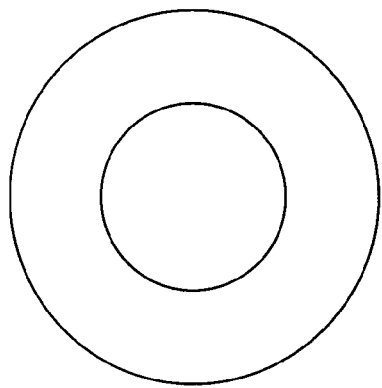
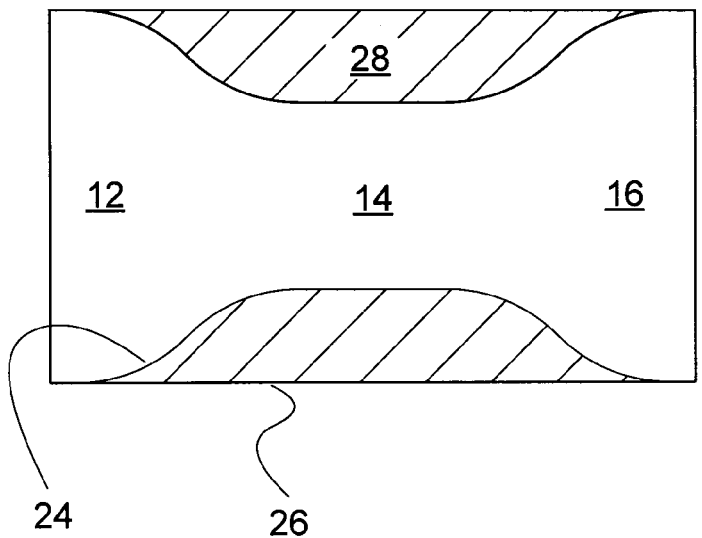
FIG. 5　　　　　　　　　　FIG. 6
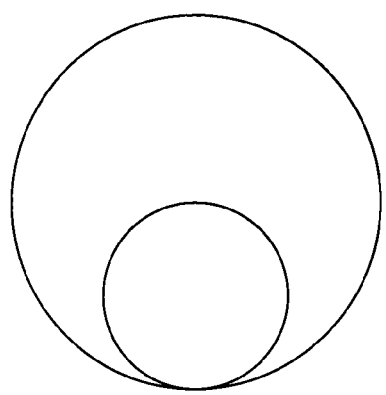
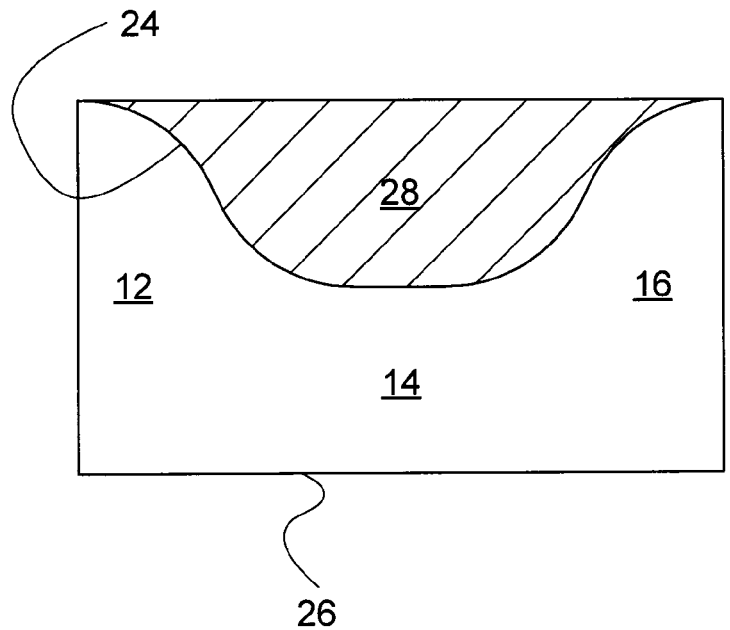
FIG. 7　　　　　　　　　　FIG. 8

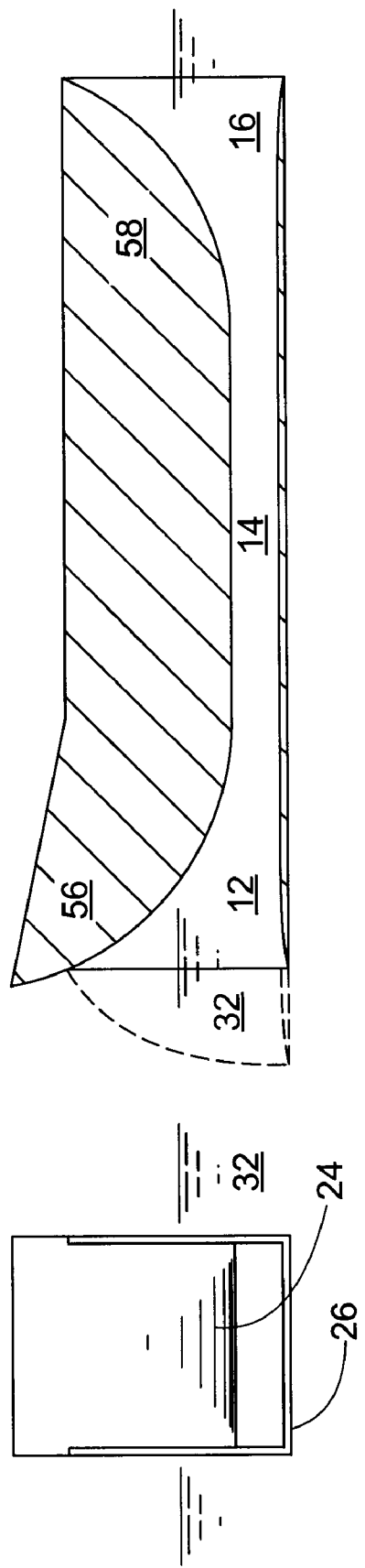

A-A

B-B

C-C

D-D

WAVELESS HULL

BACKGROUND OF INVENTION

1. Field of the Invention

The invention relates to hull shapes for ships and submarines that substantially eliminate waves caused by movement in or on the water.

2. Description of the Related Art

A traditional hull that is found in the prior art has a pointed end at the bow, and a blunt transom at the stern. When moving forward through the water, the bow generates a bow wave and the stern generates a stern wave and a transverse wave. The vessel also generates pressure waves directed downward. Transverse waves are generated by both sharp and blunt-end sterns.

Generating these waves requires displacing large masses of water, does not assist with the efficiency or the seaworthiness of the vessel, and wastes a great deal of energy. These waves also present a hazard to other vessels, and can be a source of danger or discomfort to their crews and passengers. One example is an accident that occurred in August, 1999, in the Cape Cod Canal. The admiralty court found that the accident was caused by the large waves generated by a passing ship. The accident caused US $1.3 million in damage. Large waves also greatly contribute to bank and channel erosion, and weaken bridge and pier supports. It is apparent that a vessel hull that reduces or eliminates bow, stern, and transverse waves would be very beneficial.

Others have attempted to modify the hull design to reduce or eliminate waves. One of them is U.S. Pat. No. 6,112,687 (the '687 patent), which is not admitted to being prior art by its mention in this Background section. In this patent, a "displacement body" is disposed on the underside of the hull and shaped to cancel the waves the hull would otherwise make. This hull does not take pressure waves generated in the downward direction into account at all, and would only be efficient at its rated hull speed.

Another example is disclosed in the U.S. Pat. No. 5,954,009 (the '009 patent), which teaches the application of a "wake reflector system" disposed about a traditional hull shape to contain the bow, stern, and transverse waves. The specification claims that the system is applicable to both surface vessels and submarines. Like the '687 patent, this patent does not take waves generated in the downward direction into account, and it does not attempt to reduce the formation of the waves themselves. The waves are only contained until the vessel has traveled clear of the zone of their immediate effect.

Icebreakers are specialized vessels that typically use their weight to ride on top of ice to break it. Icebreakers typically leave the resulting channel full of broken ice that is easy to re-freeze and block an ice-bound passage again. In addition, icebreakers of the prior art are prone to propeller damage due the presence of ice pieces floating at the surface.

What is needed, therefore, is a vessel hull that does not create bow, stern, or transverse waves when moving through the water, and that can break and clear ice from a channel without endangering a vessel's propulsion means.

SUMMARY OF INVENTION

An invention that satisfies the need for a vessel hull that does not create bow, stern, or transverse waves when moving through the water has an exterior surface having a substantially constant cross-section along the length of the hull, and an interior surface that substantially encloses a flow channel for the length of the hull, the interior surface comprising a converging-diverging diffuser. An icebreaker version has a plow that breaks ice from the bottom and transports it clear of the channel. These and other features, aspects, and advantages of the present invention will become better understood with regard to the following description, claims, and accompanying drawings.

BRIEF DESCRIPTION OF DRAWINGS

FIG. 5 is a front view of a hull for a submarine.

FIG. 6 is a cutaway side view of the hull shown in FIG. 5.

FIG. 7 is a front view of an alternative asymmetric hull for a submarine.

FIG. 8 is a cutaway side view of the hull shown in FIG. 7.

FIG. 14 is a front view of a hull according to the present invention that has been tested.

FIG. 15 is a cutaway side view of the hull shown in FIG. 14.

DETAILED DESCRIPTION

A vessel hull according to the present invention has an exterior surface having a substantially constant cross-section along the length of the hull, and an interior surface that substantially encloses a flow channel for the length of the hull, the interior surface comprising a converging-diverging diffuser. Several embodiments were claimed in U.S. Pat. No. 6,647,909, invented by the same inventor as the present invention, which is hereby incorporated by reference as though completely rewritten herein.

Figure 1:
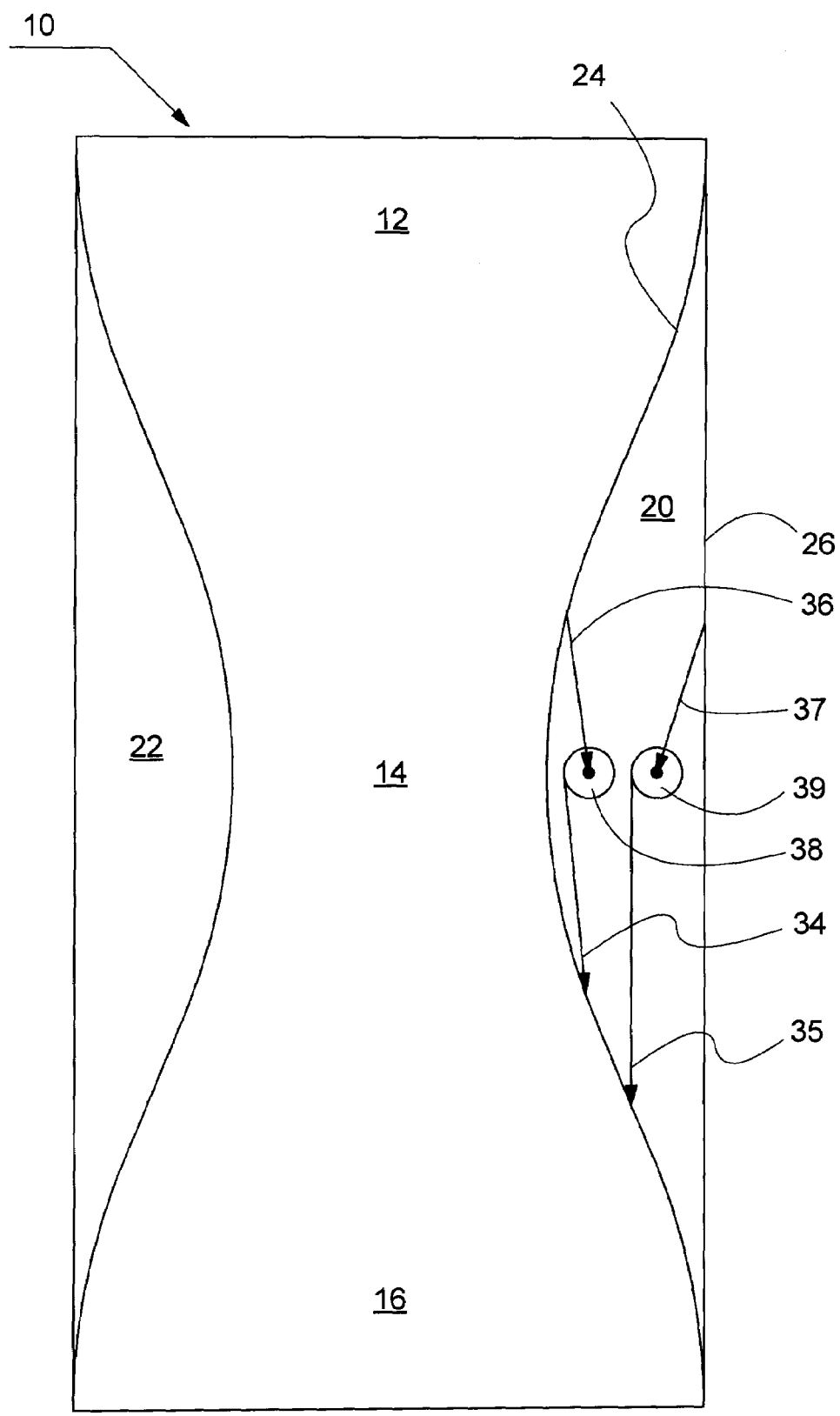
FIG. 1 is a cutaway side view of a hull according to the present invention.

Turning to FIG. 1, the vessel hull 10 can generally be described as having an exterior surface 26 that has a substantially constant cross-section along the length of the hull. This means that the exterior surface 26 does not curve from the bow to the middle to the stern when viewed from above, like conventional hulls. The surfaces making up the exterior surface 26 should be parallel to the direction of the vessel's travel at every section of the vessel. The exterior surface 26 is a cylinder in which all generating lines are parallel to each other.

The exterior surface 26 is preferably a regular polygon, but can be almost any geometric shape. Preferred shapes are rectangles, hexagons, octagons, decagons, circles, and ovals.

The interior surface 24 should enclose most of the water displaced by the vessel, and preferably encloses all of the water. The vessel will not be as efficient if there are gaps and holes admitting water from the exterior surface 26 to the interior surface 24 at any other place besides the bow and the stern, but the scope of this specification is such that they should be considered equivalents to the present invention.

There are several ways to propel the vessel that will substantially maintain its waveless qualities. One example is a water-jet drive option using a pump 38, 39 shown schematically in FIG. 1. In one configuration, water is drawn through an inlet 36 in the converging portion 12 or middle throat 14 of the diffuser. The water's energy state is increased using a pump 38 or another means having substantially the same function. The water is then expelled into the diffuser aft of the middle throat 14 through an outlet 34. Water may be drawn also through an inlet 37 from an opening in the exterior surface 26. The water's energy state is likewise increased using a pump 39 or other means having substantially the same function. The water is then expelled into the diffuser aft the middle through 14 through an outlet 35. One would employ both water drive jet options to match the velocity of the water at the diffuser exit 16 with water outside the exterior surface 26. Propellers secured in the flow stream, either ducted or unducted, may also be used, but any conventional drive, including sails, may be employed.

Another alternative is to pump air from the surface to an outlet 34 behind and the middle throat 14 of the hull. The air bubbles will increase the volume of the mass in the diverging portion of the diffuser, and would push the mass towards the stern throat 16, thus propelling the vessel forward. Although not shown in FIG. 1, rocket motor propulsion may also be used to drive the vessel.

Two other examples of suitable propulsion means include the electromagnetic thrusters disclosed in U.S. Pat. Nos. 2,997,013, and 5,333,444. Application of these thrusters to the present invention would make a very quiet, and very stealthy vessel.

The cross sectional area of the bow throat 12 and the stern throat 16 should be the same. The cross sectional area of the middle throat 14 should be between about 40% and 70% of that of the bow and stern throats.

One of the major advantages of this type of hull is that it recovers the energy that the hull would otherwise put into displaced water, e.g. waves, while the hull is in forward motion. Conventional hulls move the water aside and the work to do this task is not recovered. The hull of the present invention does not move the water aside, but accelerates it in the converging diffuser in the axial direction along the hull. Subsequently, the energy is recovered, minus hydraulic friction losses, in the diverging part of the diffuser. These losses must be made up by the propulsion of the vessel.

Figure 2:
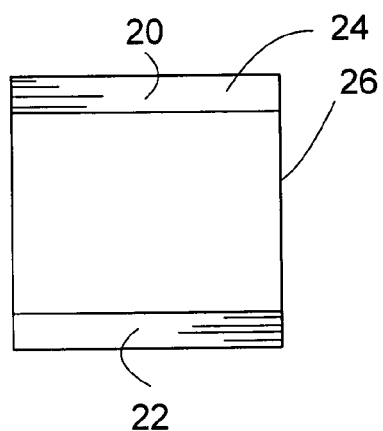
FIG. 2 is a front view of a hull according to the present invention.
Figure 3:
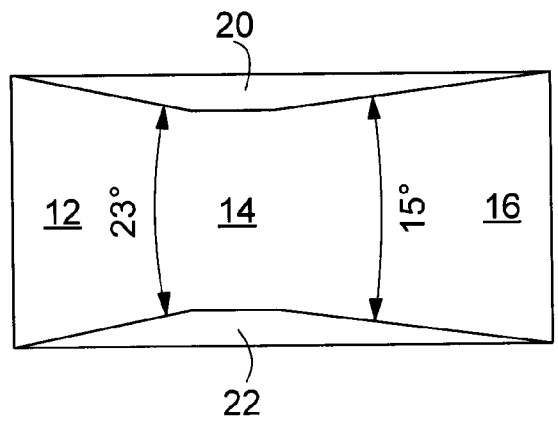
FIG. 3 is a cutaway side view of the hull shown in FIG. 2.

FIGS. 2 and 3 show different views of a hull according to the present invention. Testing has shown that favorable results are obtained when the converging portion of the diffuser is formed at about 23 degrees from side to side of the interior surface 24, and the diverging portion of the diffuser is formed at about 15 degrees from side to side of the interior surface 24, as shown in FIG. 3. (Ref. "Fluid Mechanics Measurements," Goldstein, R. J., Taylor & Francis, 1996.)

Figure 4:
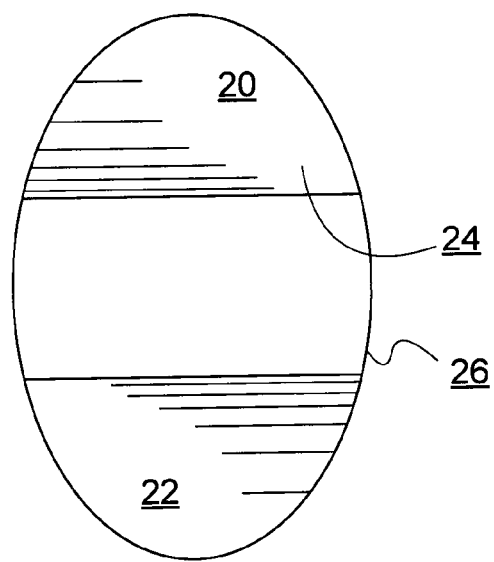
FIG. 4 is a front view of an oval shaped hull.

FIG. 4 is a front view of a hull having an oval-shaped exterior surface 26. In addition, the interior surface 24 is curved, and not made up of flat panels. The interior surface 24 is, therefore, saddle-shaped. The benefit of having an oval-shaped hull like in FIG. 4 is that there is less wetted surface area that would cause friction in the water. The benefit of having a curved interior surface 24 is that the flow of water through the hull would not be abruptly changed, which causes turbulence and reduces the efficiency of the hull. The hull of FIG. 4 is therefore more fuel-efficient than the hull shown in FIGS. 2 and 3. However, the construction costs of the hull of FIG. 4 would be greater than that of the hull shown in FIGS. 2 and 3 because of the difficulty in making curved surfaces.

FIGS. 5 and 6 show the front view and cut away side view of a submarine hull according to the present invention. For submarine hulls, the preferred exterior surface 26 is circular. The spaces formed between the interior surface 24 and exterior surface 26 are different, and the higher space 28 would have to be more buoyant than the other parts of the hull. Comparing the interior surfaces 24 of the hull of FIG. 4 and the hull of FIG. 5, it is important to note to that the shape of the converging-diverging diffuser can be the same around the circumference of the interior surface 24, or it can have an upper part, and the lower part for separating ballast 22 and cargo 20. For liquid cargoes, the separating lines will be less distinct. Both types of hulls are part of the present invention.

FIGS. 7 and 8 show an alternative, asymmetric hull design for either a submarine or a surface vessel. These views make it clear that the spaces between the interior and the exterior surfaces can be biased to one side, e.g. the upper side, of the hull. This may increase stability, decrease construction costs, and have other benefits. However, the waveless qualities of the hull are nearly the same as the hull shown in FIGS. 5 and 6.

Figure 9:
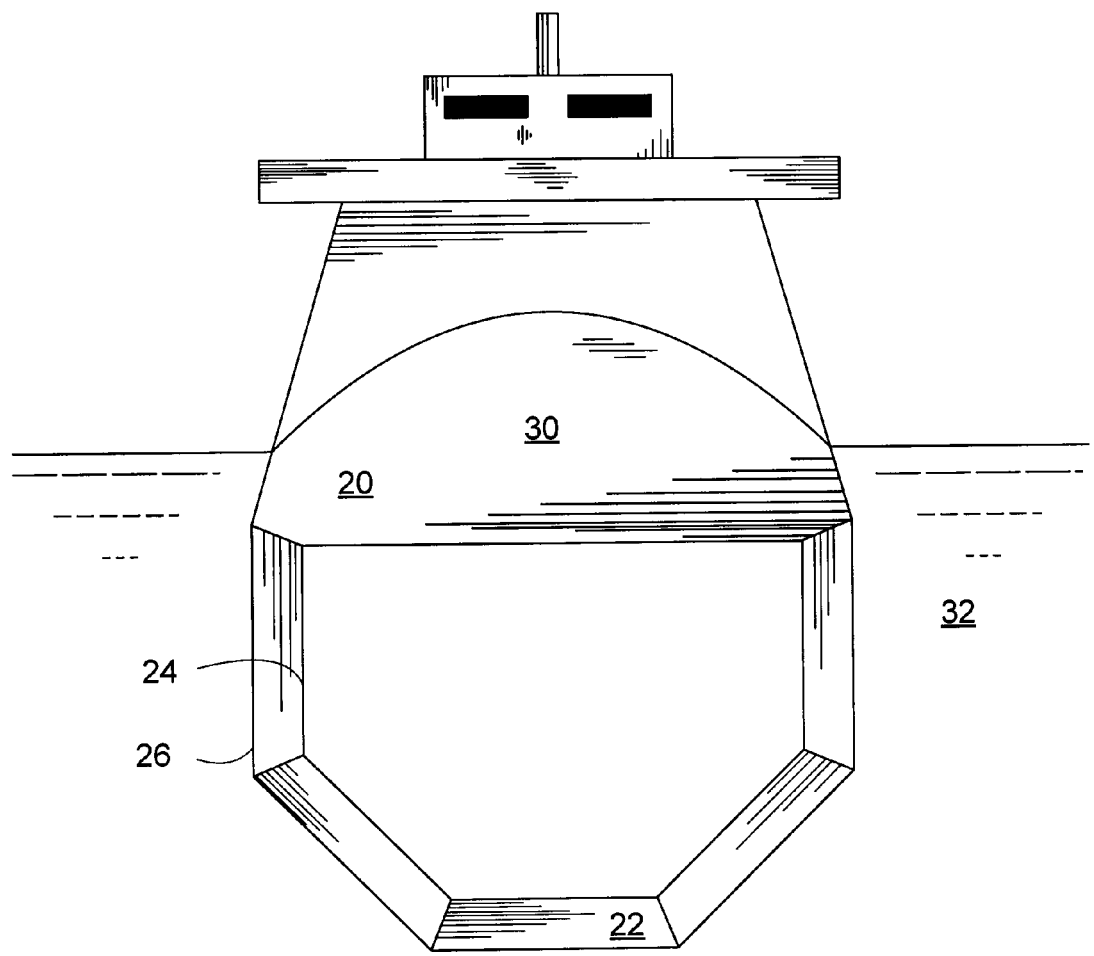
FIG. 9 is a front view of a ship having a hull according to the present invention.

FIG. 9 is a front view of a ship having a hull according to the present invention. Several important features can be seen in this view. For example, the vessel sits in the water 32, and has a ballast portion 22 near the bottom and a standard cargo area 20. This hull is modified octagonal shape. From bow to stern, the panels of the interior surface 24 could be flat, like the example shown in FIG. 3, or they can be curved and saddle shaped like the hull shown in FIG. 4. These are engineering choices left to the naval architect. In addition, notice a portion of the hull 30 that is raised above the waterline. This portion of the hull forms a bow that protects the vessel against water that crests up in front of the hull before it is drawn into the throat of the hull when the vessel is in motion.

A hybrid vessel incorporating a standard displacement hull shape with the waveless hull structures of the present invention can also be designed. This may be advantageous for retrofitting existing boat hulls with waveless hull structures. A hybrid vessel would not have an exterior surface with a substantially constant cross section along the length of the hull, since the bow would be pointed.

Figure 10:
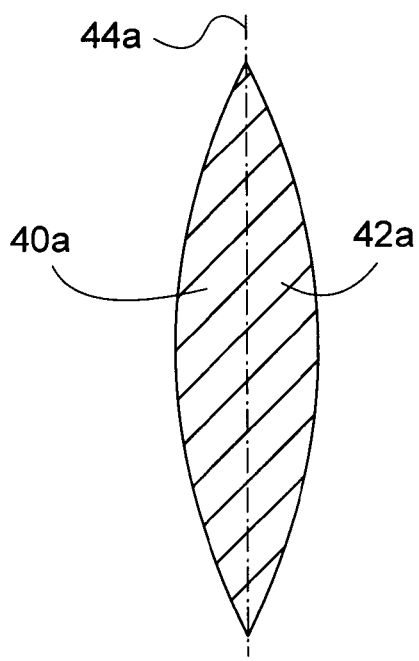
FIG. 10 is a cutaway plan view a hull of the prior art.
Figure 11:
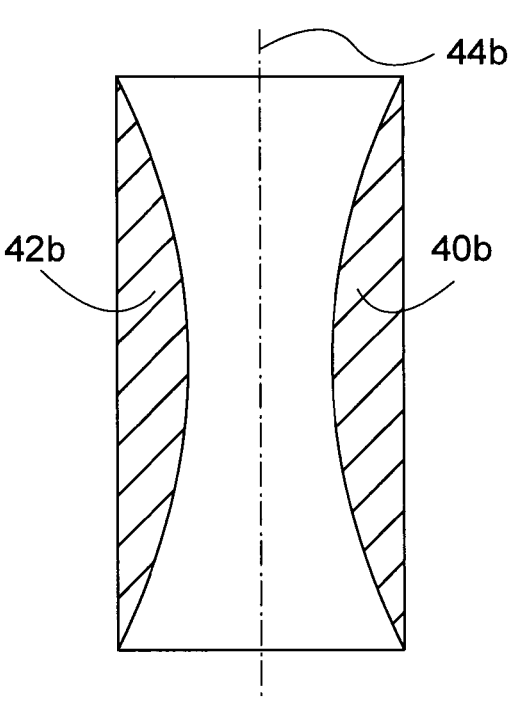
FIG. 11 is a cutaway plan view of a hull according to the present invention.

FIG. 10 is a cutaway plan view of a hull according to the prior art. It is characterized by a port side 40a and a starboard side 42a that are symmetrical about the centerline 44a. The port side 40a and the starboard side 42a form a unitary, cigar-shaped hull structure. To make a hull according to the present invention that would nominally have the same operating characteristics, one could split the hull down the center line 44a, move the starboard side 42a to port, move the port side 40a to starboard, and secure them at a distance to obtain a hull as shown in FIG. 11.

Figure 12:
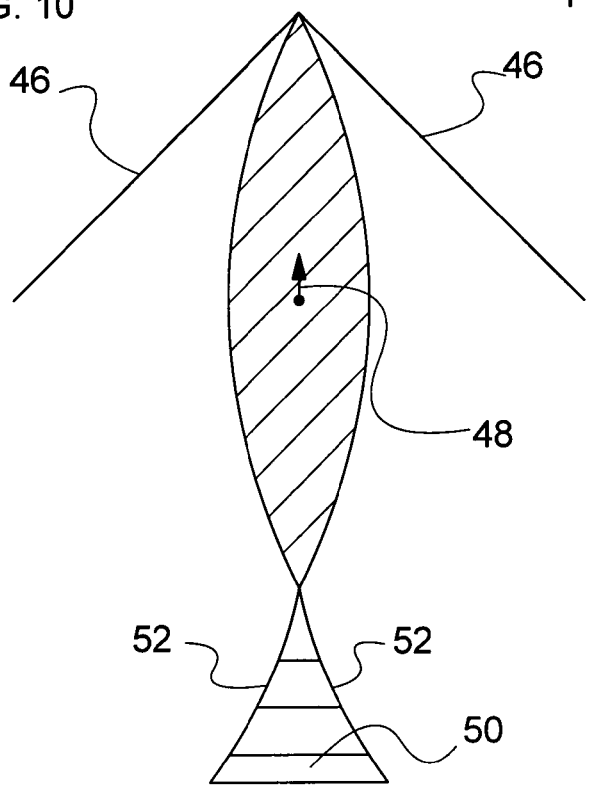
FIG. 12 illustrates the waves generated by a hull of to the prior art.

FIG. 12 illustrates the wave making properties of a hull according to the prior art. The arrow 48 indicates the direction of hull travel. It is shown that the hull makes three distinct waves as it travels forward through the water. First, the bow produces divergent bow waves 46. This is a pressure wave. The stern makes divergent stern waves 52, which is made by suction. Associated with the stern waves are transverse waves 50, made by water filling in the volume displaced by the vessel hull. To summarize, a vessel moving forward 48 must expend energy to make and overcome its bow wave 46, overcome the suction of the stern wave 52, and expend energy on the formation of transverse waves 50.

Figure 13:
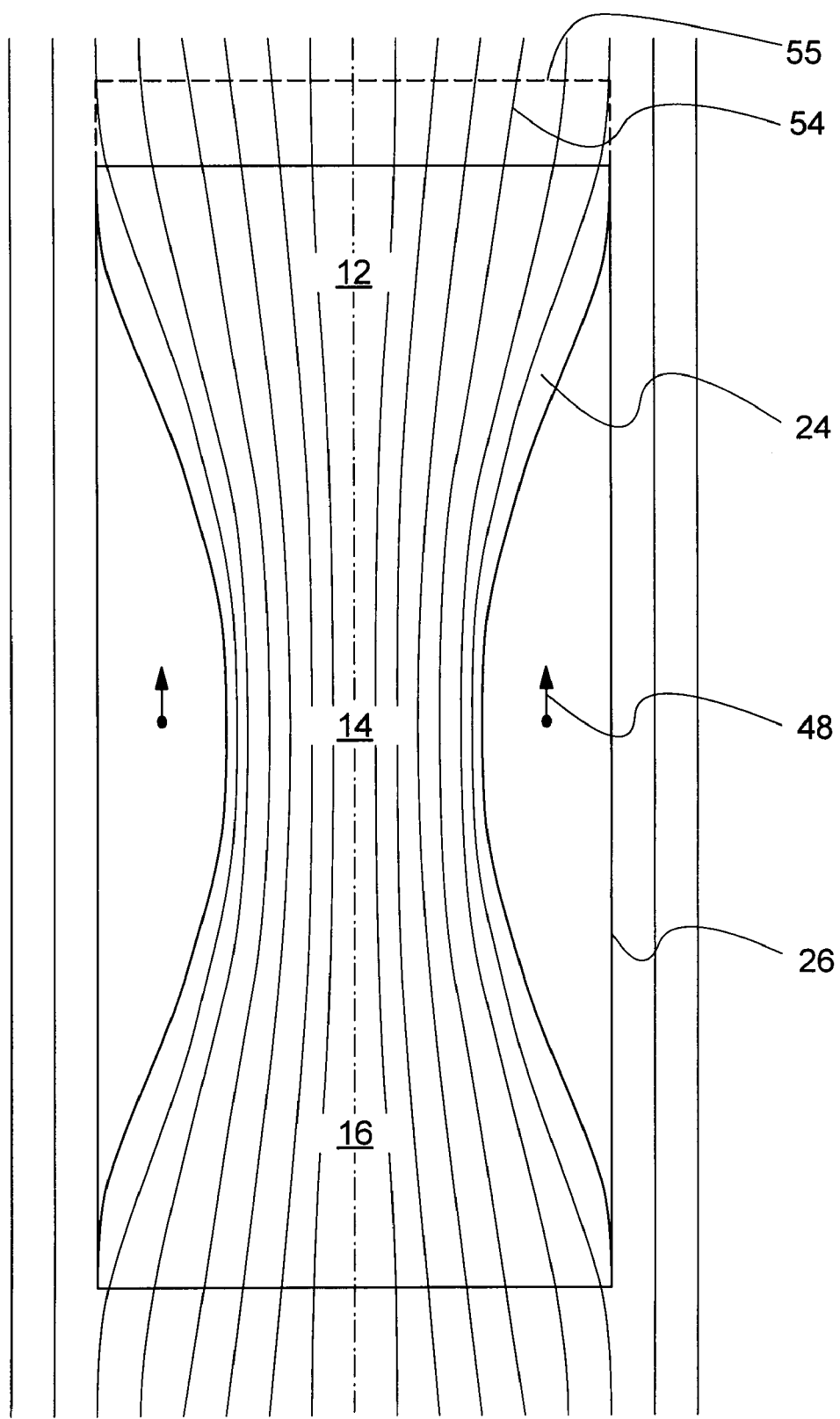
FIG. 13 is a cutaway plan view of a hull according to the present invention illustrating the flow of water through the hull.

FIG. 13 shows how the hull of the present invention avoids making waves. Flow lines 54 show the direction of travel of water inside and outside the hull. The exterior surface 26 is parallel to the direction of travel, and therefore does not displace water to the outside, which would make waves. Instead, water is directed along the interior surface to the bow throat opening 12. The lines of flow are compressed to a maximum at the middle throat 14, and expand to a flow nearly parallel to that of the outside water as it leaves the stern throat opening 16. The water as it is traveling through the throat 14 of the hull travels faster, and must have a lower static pressure than at the openings 12 and 16, according to the laws of conservation of energy for non-compressible fluids. The use of the converging-diverging diffuser substantially reduces turbulence, and does not make waves exterior to the vessel. This reduces energy consumption of the vessel for the formation of waves. The flow conditions at the bow throat 12 and the stern throat 16 are about the same. Therefore, no major waves propagate to the surroundings. At high speeds, the exterior hull may have to protrude forward of the interior surface as shown by the dotted lines 55.

There is, however, a penalty for the containment of the waves. There is an increased wetted surface area as compared to a conventional hull. Therefore, there are higher friction losses due to the increased surface area. In addition, there are higher friction losses in the diffuser section due to the increased velocity of the water through the hull. Altogether, the friction losses can be a few times higher than the losses for a conventional hull. These losses increase with the square of the hull velocity. Since the losses for wave making by a conventional hull rise with the 3rd, 4th, 5th, 6th, or higher power of the velocity, then trading them for the friction of the hull of the present invention will always be advantageous at higher speeds. The necessary and unexpected conclusion is that the hull of the present invention will not be subjected to a hull velocity phenomenon, and therefore it can achieve much higher speed than a conventional hull.

Instead of being completely waveless, it is more technically correct to say that the hull of the present invention creates a standing, half-wave starting at the bow throat opening 12, and cresting at the middle throat 14. It is a half wave because it does not have a corresponding pressure part of the wave. There are no bow, stern, or transverse waves. The only waves expected to be generated by the hull motion are small waves due to the boundary layer on the exterior hull surface 26, and the water velocity mismatch between the diffuser exit and the surrounding water due to the propulsion of the hull, excluding sail propulsion. The mismatch will inherently increase with the hull's speed and may require optimizing the propulsion/stern interface to minimize the hull's wake.

FIG. 14 is a front view of a practical vessel hull according to the present invention. One can see the flow channel below the water 32 defined by the space between the interior surface 24 and the exterior surface 26. Such a hull was tested using jet propulsion shown schematically in FIG. 1. A small bow crest was contained within the inlet throat 12 without disturbing the surrounding water 32.

FIG. 15 is a side, cut away view of the hull shown in FIG. 14. In most respects, the hull is very similar to a hull according to the prior art, except for the additional structure of the exterior surfaces 26 that define a flow path. The bow of the hull 56 is slightly elevated compared to the stern 58 for much the same reason as a conventional hull. A waveless bow must contain the entire crest generated by the bow 56. At high speeds, the exterior hull 26 may have to protrude forward of the interior surface 24 as shown by the dotted lines in FIG. 15. In a submarine, the extended inlet that contains the pressure "crest" will be a cylinder as shown in the dotted lines in FIG. 13.

One must realize that a propulsion device speeds up a significant portion of the water flowing through the converging-diverging diffuser. This produces a suction effect at the diffuser inlet, thus reducing the size of the crest for surface vessels as well as the pressure "crest" for submarines as compared to conventional hulls. For waveless hulls, these crests cannot "spill over" the exterior hull 26.

The hull of the present invention may have many advantages over a conventional hull where the wave resistance can be many times more than the friction resistance of the vessel. Based on a book titled "Sailing Theory and Practice", by C. A. Marchaj, published by Dodd, Mead & Co, New York 1964, wave-making begins to have an effect when the value of Vs*SQR(L) reaches about 0.7. In this equation, Vs=speed of the boat, L=length of the water line. For the values Vs/(SQR(L))=1.1 and higher, the resistance increases rapidly and can rise to the 3rd, 4th, 5th, or even 6th power of the boat speed while the friction resistance rises with the second power of speed.

According to the book mentioned above, a model was tested at the Stevens Institute of Technology for a sailboat having the following dimensions: length overall=45.5 feet, water line length=32.26 feet, beam=10.58 feet, draft=6.56 feet, and displacement=11.38 tons (25,500 pounds). The friction resistance of hull equals the wave making resistance at 6.3 knots, each being 110 pounds. However, at 8.4 knots, the wave making resistance is 816 pounds, which is 4.46 times larger than the frictional resistance, 183 pounds. Above about 8.4 knots, the wave making resistance rises even more rapidly. This limits the finest, heavy-displacement keelboats to speed/length ratio of about Vs/(SQR(L)) =1.4. The America's Cup sailing vessels exceed 1.45. Destroyers exceed 2.0. With the length of destroyers ranging from 320 feet to 450 feet, they must be moving at about 40 knots. This indicates an enormous opportunity for saving the energy used in wave making.

Another advantage of the novel hull is its stability due to a large mass of water in the converging-diverging diffuser inside the hull. During maneuvering, however, that water must turn together with the hull, which may require rudders not only in the stern but also in the bow. The diffuser walls, both at the bow 12 and stern 16, may accommodate the rudders as parts of the walls, so that the rudders will not protrude into the flow path when the hull is moving straight. Such rudders will have an advantage over the protruding rudders applied in the prior art that may account for as much as 15% of the total drag losses.

Figures 16, 17:
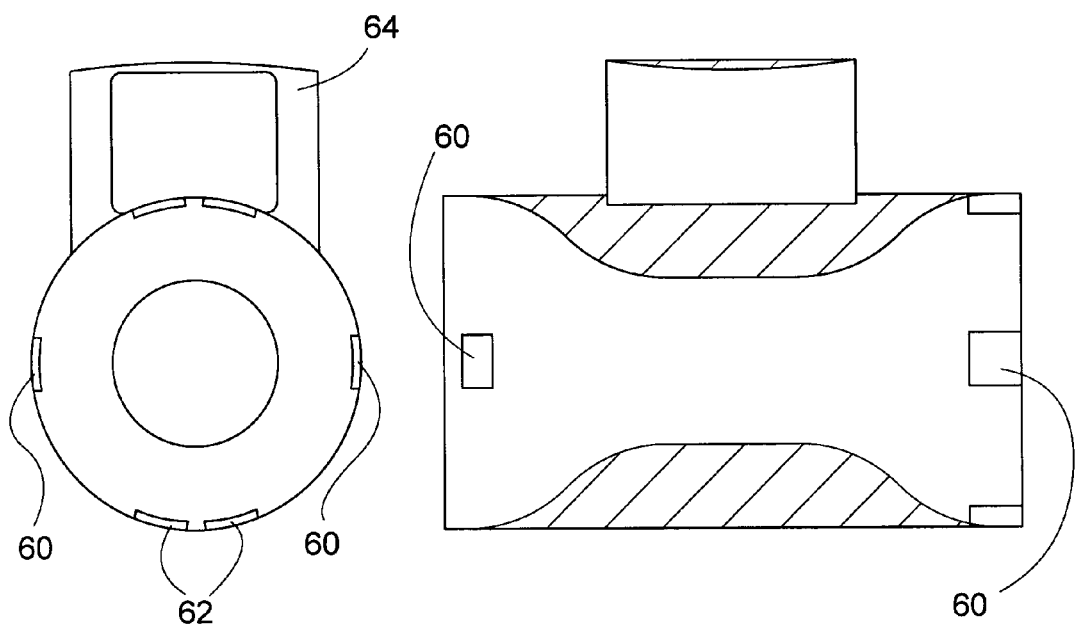
FIG. 16 is a front view of a submarine.
FIG. 17 is a cutaway side view of the submarine shown in FIG. 16.
Figure 18:
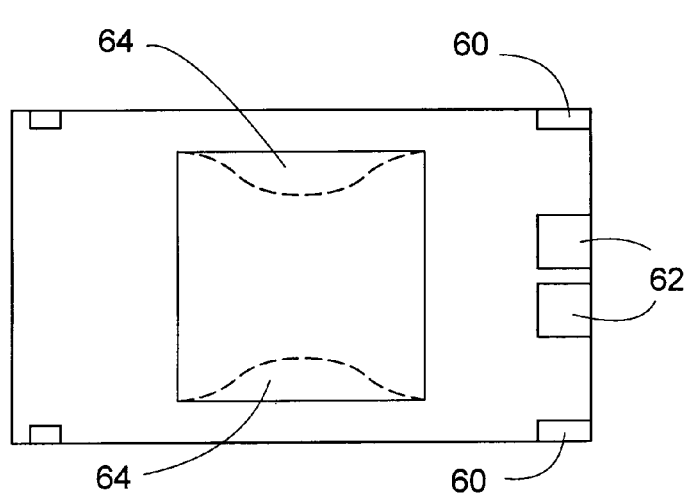
FIG. 18 is a top view of the submarine shown in FIG. 16.

The water turning with the vessel during maneuvering may also rotate inside the diffuser due to the Coriolis effect. To prevent hull rotation by friction forces between the rotating water and the hull, stabilizing rudders will be needed. The same rudders may also be used to counteract rolling of the hull due to waves. FIGS. 16, 17 and 18 depict schematically the steering rudders 60 and stabilizing rudders 62 in a submarine, where the sail 64 is a double and waveless as well. Stabilizing rudders 62 should be provided in pairs.

Figure 19:
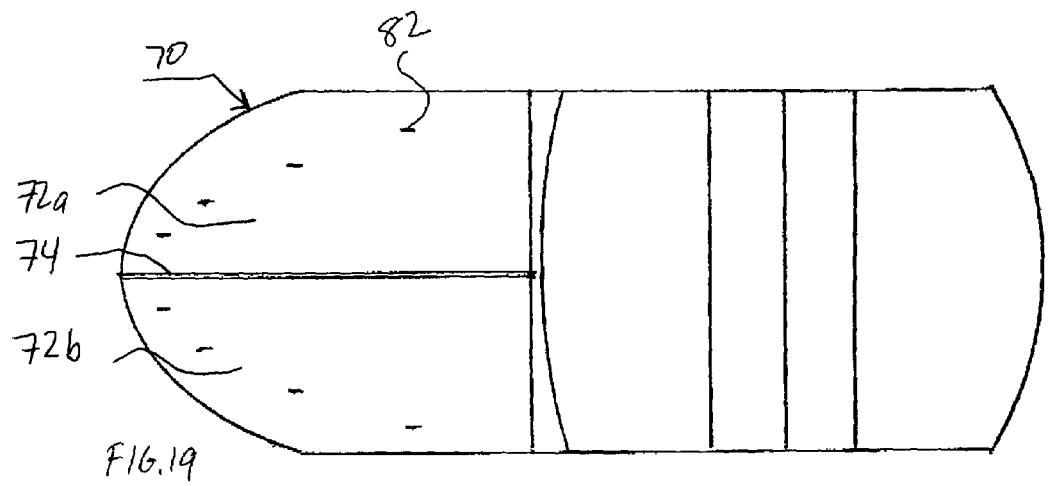
FIG. 19 is a plan view of an icebreaker having a plow structure at its bow.

A waveless hull may also provide the ideal hull form for an improved icebreaker. FIG. 19 is a plan view of a vessel having a plow structure 70 for breaking ice. The plow 70 is formed at the bow of the vessel and has two symmetric halves 72a and 72b about the centerline. Optionally, a blade 74 can be provided to facilitate the plow breaking the ice, which will be discussed further below.

Also in this plan view are seen eight wedges 82 protruding from the surface of the plow 70. These wedges 82 are for scoring the bottom of the ice sheet after it is lifted to facilitate breaking ice sheets into even widths. New ice that is up to one meter thick and homogeneous can be much harder to break than ice that has frozen into chunks. The wedges introduce cracks into ice sheets where the bottom surface is in tension after the blade 74 has lifted the sheet and put it into compression. More or fewer than eight wedges 82 can be used. Another embodiment of the wedges is sharp wheels, like pizza cutters, that can also be supported and located using hydraulic pistons. This feature is very important for operation in areas like the Great Lakes or oceans where ice freezes homogeneously very quickly.

Figure 20:
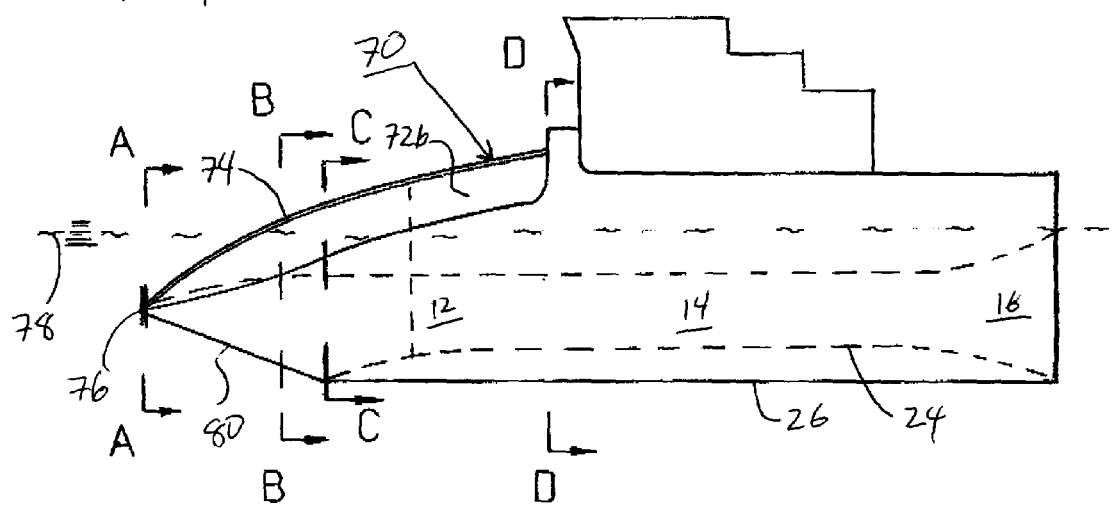
FIG. 20 is a side elevation of the icebreaker of FIG. 19.

FIG. 20 is a side elevation of the icebreaker of FIG. 19 showing how the plow 70 is arranged. The bow portion 76 of the plow is below the waterline 78 when the vessel is in icebreaking mode. The icebreaker of the present invention uses its buoyancy instead of its weight to break the ice, not from the top, but from the bottom. The waveless hull features, particularly the water jet or air bubble propulsion means, would eliminate the problem of propeller damage caused by ice because there is no propeller.

In practice, the vessel can adjust its trim, perhaps by changing its buoyancy, to make sure the bow 76 is below the bottom of the ice. The vessel would move forward, and the plow 70 would wedge itself under the ice. As the vessel continues moving forward, ice is lifted above the water and ice line. Due to the raised shape of the plow, ice then slides off the vessel onto the remaining ice pack instead of the in the channel as in the prior art. The result is a clear channel free of floating ice, and one that is more likely to remain clear for a longer time.

One option is to provide a blade 74 disposed at the peak of the plow for lifting and breaking the bottom of the ice. This would make it easier to clear the ice. The blade can have a blunt edge, a sharp edge, a serrated edge, or have teeth. Another option is to provide a strut 80 between the plow and the bottom of the hull to add strength.

FIG. 20 is the front elevation of the vessel from the bow 76, and showing the optional strut 80. The concave shape in this view is not the shape of the plow 70, but a projection of the pointed bow of the vessel.

Figure 21:
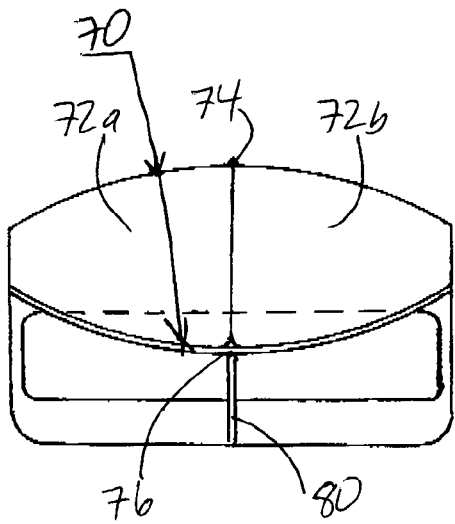
FIG. 21 is a front elevation of the icebreaker of FIG. 19.
Figure 22:
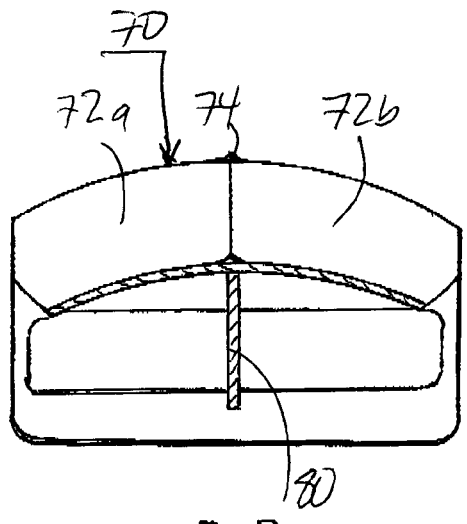
FIG. 22 is a cross-section near the bow of the icebreaker of FIG. 19.
Figure 23:
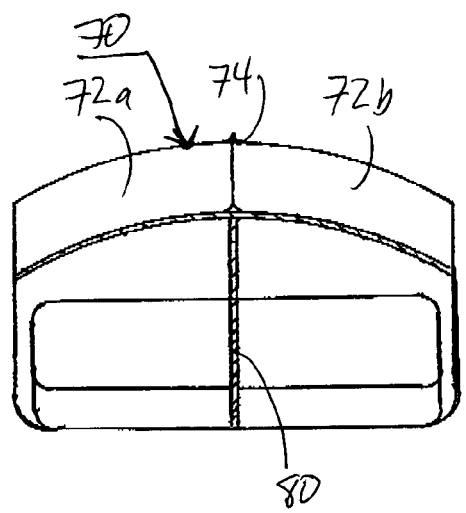
FIG. 23 is a cross-section near the middle of the plow of the icebreaker of FIG. 19.
Figure 24:
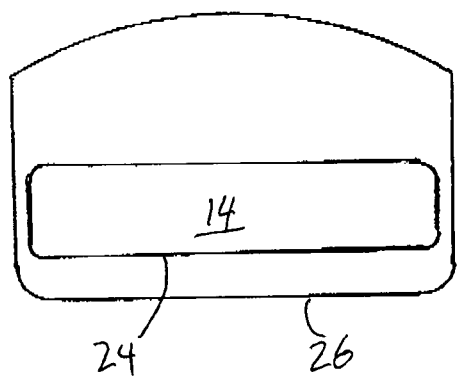
FIG. 24 is a cross-section of the icebreaker of FIG. 19 aft of the plow.

FIGS. 21 and 23 are cross-section views which accurately show one embodiment of the shape of the plow. In these views it is shown as convex. However, it could also be a chevron or other shape. The important feature is that the raised portion of the plow 70 is higher in the middle along the centerline of the vessel and the plow than the edges of the vessel. FIG. 24 shows a cross-section of the vessel aft of the plow 70.

The icebreaker embodiment has many advantages over the prior art. The invention would enable building icebreakers to accommodate ships with beams over 26 meters. It would allow the use of oil tankers of 50,000 tons, which would open a new, competitive way to transport oil that would compete with pipeline oil transportation. Any desired width of channel can be cut using a wider icebreaker and creating more ice strips. Also, the channel left behind the icebreaker would be free of floating ice. A clean, parallel channel is less likely to produce a convergent ice field, which is currently the major cause of stopping convoys, even in thin ice. The icebreaker with a waveless hull would be faster in all ice conditions, and be more reliable because its propulsion would be deep in the water where it would have less contact with ice. The icebreaker would be less likely to get stuck, since it would lower its buoyancy to sink lower in the water to free itself from ice. Finally, this novel icebreaker could operate in fast ice regions, such as Siberia, that may extend over 300 miles from the coastline, and which is presently avoided because of the difficulty of passing through it due to the ice. For references, see: Haas, C.; Rupp, K.-H.; Uuskallio A., Comparison of Along Track EM Ice Thickness Profiles with Ship Performance Data, 1999, POAC'99 Proc. of the 15th Int. Conf. on Port and Ocean Engineering Under Arctic Conditions, Espoo, Finland, Aug. 23–27, 1999, Helsinki Univ. of Techn., Ship Laboratory, 343–353; and Ragner, C. L., Northern Sea Route Cargo Flows and Infrastructure-Present State and Future Potential, The Fridtjof Nansen Institute, FNI Report 13/2000.ISBN 82-7613-400-9.

In conclusion, the hull of the present invention has many different potential applications. A partial list is as follows: torpedo, submarine, cruiser, destroyer, aircraft carrier, yard patrol craft, coastal patrol ship, special operations craft, pilot boat, harbor boat, rescue boat, tug boat, air-driven lake boat, ferry, tanker, freighter, semi-submersible cargo ship, ocean liner/cruise ship, barge, ferry, motorboat, ski boat with an adjustable diffuser at speed, personal watercraft, sailboat, icebreaker, and even an airship/blimp.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A hull for vessels comprising an exterior surface, an interior surface under the hull's waterline and propulsion means, wherein said exterior surface has a substantially constant cross section along the length of the hull, said interior surface substantially encloses a flow channel for the length of the hull, the interior surface further comprising a converging-diverging diffuser, and said propulsion means is at least one of a rocket motor water-jet drive, said water jet drive comprising at least one of a) a water inlet in the converging portion or middle throat of the diffuser in communication with a pump, which is in communication with a water outlet in the diverging portion of the diffuser, and b) a water inlet drawing water from outside the exterior surface in communication with a pump, which is in communication with a water outlet in the diverging portion of the diffuser.

2. The hull of claim 1, wherein said exterior surface has a cross section of a regular geometric shape taken from the group consisting of a rectangle, hexagon, octagon, decagon, circle, and oval.

3. The hull of claim 2, wherein said diffuser is formed by converging and diverging surfaces on opposite sides of said geometric shape.

4. The hull of claim 3, wherein one of said opposite sides is a side of said geometric shape that is nearest the waterline, and the opposite side is near of the deepest part of the hull when the vessel is in water.

5. The hull of claim 3, wherein one of said opposing surfaces is nearest the waterline, and the other opposing surface is near the deepest part of the hull when the vessel is in water.

6. The hull of claim 5, wherein the converging-diverging surface that is nearest the waterline is adapted to hold a vessel's cargo.

7. The hull of claim 5, wherein the converging-diverging surface that is near the deepest part of the hull is adapted to hold a vessel's ballast.

8. A hull for ice breaking vessels comprising an exterior surface, an interior surface under the hull's waterline, a plow, and propulsion means, said interior surface substantially enclosing a flow channel for the length of the hull, the interior surface further comprising a converging-diverging diffuser, said plow secured to and axially aligned to the bow of the hull, and said plow comprising a structure having a surface that is raised along the centerline of the hull and lower nearest the sides of the hull, under the hull's waterline at the bow, and over the hull's waterline aft, the hull further comprising a blade disposed at the peak of the raised structure adapted to score the ice for initiating a crack that facilitates ice breaking.

9. The hull of claim 8, said blade comprising serrated teeth.

10. The hull of claim 8, said blade comprising a sharp edge.

11. The hull of claim 8, further comprising a plurality of spaced wedges secured to the plow and adapted to score the underside of an ice sheet.

12. The hull of claim 8, further comprising a plurality of spaced hinged wheels secured to the plow and adapted to score the underside of an ice sheet.

13. The hull of claim 12, further comprising hydraulic pistons in communication with the plow for locating the wedges.

* * * * *